United States Patent
Mundy

[15] 3,701,980

[45] Oct. 31, 1972

[54] HIGH DENSITY FOUR-TRANSISTOR MOS CONTENT ADDRESSED MEMORY

[72] Inventor: Joseph L. Mundy, Schenectady, N.Y.

[73] Assignee: General Electric Company

[22] Filed: Aug. 3, 1970

[21] Appl. No.: 60,336

[52] U.S. Cl............340/173 AM, 307/238, 307/279, 340/172.5

[51] Int. Cl...........................G11c 11/40, G11c 15/00

[58] Field of Search...307/238; 340/173 AM, 173 FF

[56] References Cited

UNITED STATES PATENTS

| | | | |
|---|---|---|---|
| 3,551,899 | 12/1970 | Igarashi | 340/173 |
| 3,573,756 | 4/1971 | Hillis | 340/173 |
| 3,575,617 | 4/1971 | Burns | 340/173 |

*Primary Examiner*—Terrell W. Fears
*Attorney*—Richard R. Brainard, Paul A. Frank, Frank L. Neuhauser, Oscar B. Waddell, Joseph B. Forman and Paul F. Wille

[57] ABSTRACT

A content addressed memory cell containing the minimum number of access lines and the minimum number of semiconductor devices is disclosed. In this cell, each intersection of the DATA, $\overline{DATA}$, WORD, and FLAG lines contains a single transistor; preferably a metal-oxide semiconductor, field-effect transistor. By appropriate selection of these lines as inputs and outputs to the cell, the functions of writing, reading, searching, searching with mask, and refreshing are obtained.

22 Claims, 8 Drawing Figures

Inventor:
Joseph L. Mundy,
by Paul F. Wille
His Attorney.

Inventor:
Joseph L. Mundy,
by Paul F. Wille
His Attorney.

HIGH DENSITY FOUR-TRANSISTOR MOS CONTENT ADDRESSED MEMORY

This invention relates to computer memory devices and, in particular, relates to metal-oxide semiconductor (MOS) memories of the ratioless dynamic type.

Among the wide variety of types of memories, ferrite ring, plated wire, tape, disk, MOS, etc., one characteristic generally considered of a memory is the cost per bit. By virtue of the large number of bit storage areas obtainable in a single fabricating operation, the MOS memory has the potential, at least, of achieving the lowest cost per bit. MOS memories generally fall into one of two categories: ratio or ratioless.

The terms "ratio" and "ratioless" refer to the operating parameters utilized in the memory. In a "ratio" type memory, utilizing series connected MOS devices, the storage of a "1" or a "0" is greatly dependent upon the ratio of the resistances exhibited by the MOS devices, which must be carefully chosen so as to avoid errors in storage and in readout. In a "ratioless" memory, the storage of a "1" or a "0" is independent of the ratio of the resistances of the MOS devices. The term "dynamic" refers to the fact that the memory must be "refreshed" after the passage of a given amount of time. This phenomenon is more fully explained below.

As mentioned previously, one standard applied to a memory is the cost per bit of bit storage capacity. In MOS structures, this cost is roughly proportional to the area occupied by each bit storage cell in the memory; the smaller the cell area, the lower the cost per bit. Previous attempts at fabricating MOS memories have generally entailed a large number of MOS devices and leads for each bit storage cell. This, obviously, puts a lower limit on the number of cells per unit area of substrate material, with a consequent lower limit on the cost per bit.

In view of the foregoing, it is, therefore, an object of the present invention to provide an MOS memory using the minimum number of MOS devices and leads.

It is a further object of the present invention to provide an MOS memory using the minimum number of MOS devices and leads without loss of operating functions performable with the memory.

It is another object of the present invention to provide an MOS memory of substantially reduced cost per bit.

The foregoing objects are achieved in the present invention wherein there is provided a memory cell four signal leads, DATA, $\overline{\text{DATA}}$, WORD, and FLAG, and first and second pairs of MOS devices. A first pair of MOS devices interconnects the DATA, WORD, and FLAG lines. The second pair of MOS devices interconnects the $\overline{\text{DATA}}$, WORD, and FLAG lines. The interconnections for each pair are similar: each pair comprises two MOS devices having their drain electrodes connected together and coupled to the DATA (or $\overline{\text{DATA}}$) line. The source electrode of one MOS device is connected to the gate electrode of the other. The remaining source electrode is connected to the FLAG line and the remaining electrode is connected to the WORD line. In this configuration, the memory cell is capable of providing the functions of write, read, associative search, associative search with mask, and refreshing.

In an alternative embodiment of the present invention, a fifth transistor device is added to isolate the memory cell from the FLAG line. In a modification of either embodiment, the memory cell may be converted to a read only-search only memory by elimination of certain ones of the signal lines and MOS devices.

A more complete understanding of the present invention may be obtained by considering the following detailed description in conjunction with the accompanying drawings in which.

Figure 1:
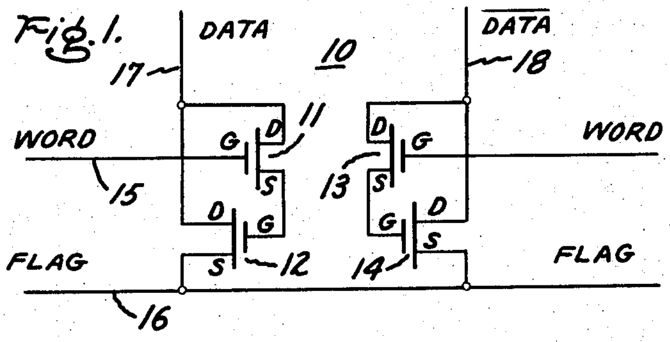
FIG. 1 illustrates a four-transistor memory cell in accordance with the present invention.

In FIG. 1 there is shown a preferred embodiment of the present invention comprising four signal lines and four MOS devices arranged one each at the intersections of the signal lines. Specifically, memory cell 10 comprises four MOS transistors 11, 12, 13, and 14, arranged in pairs to interconnect three of the four signal lines. The four signal lines 15-18 have been arbitrarily, but conventionally, designated as WORD, FLAG, DATA, and $\overline{\text{DATA}}$. In each transistor pair, transistors 11 and 13 act to pass or block signals from the DATA and $\overline{\text{DATA}}$ lines, in accordance with the information on WORD line 15, and transistors 12 and 14 serve to pass or block signals to the DATA and $\overline{\text{DATA}}$ lines or the FLAG line, depending upon the information stored. The nodal capacitances of transistors 12–15 serve to store information as presented by the signal lines.

Specifically, referring to FIG. 1, in memory cell 10 transistor 11 has its drain electrode connected to DATA line 17, its gate electrode connected to WORD line 15, and its source electrode connected to the gate of transistor 12. Transistor 12 has its drain electrode connected to DATA line 17, and the drain of transistor 11 its gate electrode to the source of transistor 11 and its source connected to FLAG line 12. Transistor 13 has its drain electrode connected to $\overline{\text{DATA}}$ line 18, its gate electrode connected to WORD line 15, and its source electrode connected to the gate electrode of transistor 14. Transistor 14 has its drain electrode connected to $\overline{\text{DATA}}$ line 18 and to the drain transistor 13, its gate electrode connected to the source electrode of transistor 13, and its source electrode connected to FLAG line 16 and the source electrode of transistor 12.

The terms "drain" and "source," as used herein, are somewhat arbitrary designations because an MOS transistor is a symmetrical device, i.e., generally one cannot tell physically or electrically which is which. The "drain" is usually considered the output side of the MOS device which, in the case of memory cell 10, means that one may have to reverse designations for some functions of the cell.

In making up a memory array for use in a computer, a plurality of these memory cells would be arranged in a matrix comprising a plurality of DATA and $\overline{\text{DATA}}$ lines in one direction and a plurality of WORD and FLAG lines in another, generally perpendicular, direction. At each intersection of these lines in the matrix would be a memory cell as illustrated in FIG. 1. WORD line 15, while shown as discontinuous in FIG. 1, would actually be a continuous line running from one side of a memory array to the other. It has not been illustrated as a continuous line in FIG. 1 in order to simplify the drawing.

Figure 2:
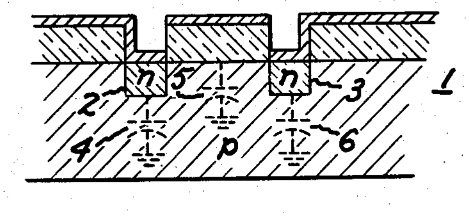
FIG. 2 illustrates the information storage features of the present invention.
Figure 3:
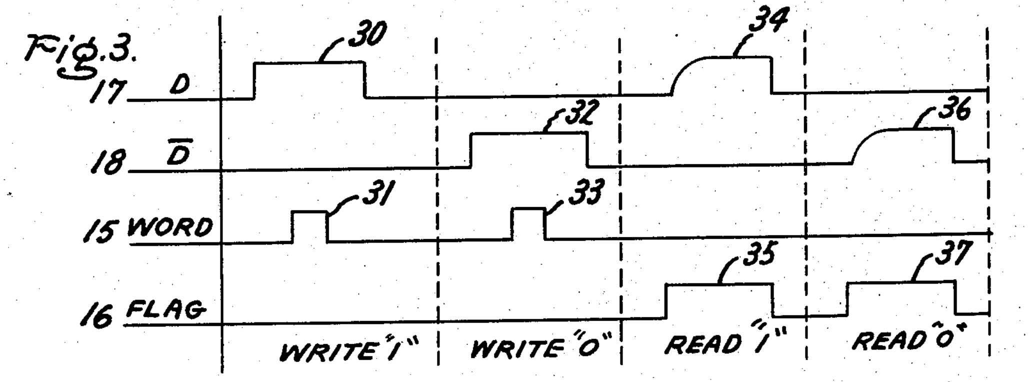
FIG. 3 illustrates waveforms useful in understanding the operation of the memory cell of FIG. 1.
Figure 4:
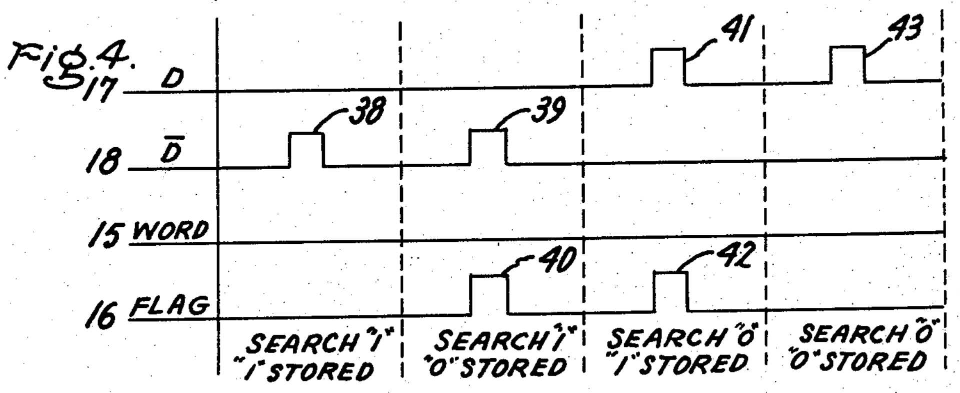
FIG. 4 illustrates additional waveforms useful in understanding the operation of the memory cell of FIG. 1.

The information storage ability and operation of memory cell 10 may be best understood by considering FIGS. 2, 3, and 4.

In FIG. 2 there is illustrated a section of memory cell 10 containing but a single transistor which may, for example, be either transistor 12 or transistor 14. As previously noted, these transistors are the metal oxide semiconductor type and generally comprise a substrate 1 having doped regions 2 and 3. For the sake of ease of explanation of the function of the memory cell, it is assumed that the MOS transistor is an "n-channel" type. In this way, a logic "1" is a high positive voltage and a logic "0" is a low positive voltage. Information is stored in the form of a charge on the nodal capacitance of the MOS device. This nodal capacitance generally comprises the capacitance exhibited between the gate of one transistor and one diffused region of an associated transistor and the substrate. This capacitance is illustrated in dotted form as capacitors 4, 5, and 6. When it is desired to store a logic "1," the capacitor formed by the MOS devices, for example, the gate of transistor 12 and the source of transistor 11, is charged to a particular value. Obviously, the polarity of the voltages involved and whether the MOS devices are of the P-type or n-type channel is a matter of design. In this specification, for ease of reference only, transistor 12 or transistor 14 is referred to as storing charge indicative of a logic "1" or a logic "0" even though transistors 11 and 13 also contribute to charge storage. The voltage stored on the MOS device is gradually dissipated through the p-n junction formed in the MOS device. Due to this dissipation of the charge, the information stored in the memory cell would gradually disappear were it not for the function of refreshing which will be more fully explained hereafter.

Memory cell 10 as illustrated in FIG. 1 is capable of performing four functions in addition to the ability to refresh the stored information. These functions are writing, reading, associative search, and associative search with mask. The operation of memory cell 10 in performing these functions may be more fully understood by considering the waveforms of FIGS. 3 and 4. When the writing function is to be performed, the DATA lines are brought to the logic levels corresponding to the information to be written into the cell. For example, as shown in FIG. 3, if it is desired to write a logic "1," DATA line 17 is raised as illustrated by pulse 30 and the $\overline{\text{DATA}}$ line 18 is maintained at a low potential. WORD line 15 is then raised as illustrated by pulse 31 which then charges the nodal capacitance on transistor 12 by virtue of the fact that the pulse on line 15 has turned on transistor 11. The conduction of current through transistor 11 then charges the nodal capacitance of transistor 12. FLAG line 16 during this time is maintained at a low potential.

If one desired to write a logic "0," then DATA line 17 would be maintained at a low potential and $\overline{\text{DATA}}$ line 18 would be raised to a high potential as illustrated by pulse 32. During the time that $\overline{\text{DATA}}$ line 18 is raised to a higher potential, WORD line 15 is raised, as illustrated by pulse 33, which turns on transistor 13 to charge the nodal capacitance of transistor 14. Writing either a "1" or "0" into the memory cell has the effect of erasing any previous information since the raising of the potential on WORD line 15 biases transistors 11 and 13 into conduction which, assuming both DATA and $\overline{\text{DATA}}$ lines 17 and 18 are ground potential, would discharge the nodal capacitances of transistors 12 and 14. Thus, it is not possible to accidentally write a logic "11" into the memory cell by first writing a logic "1" and then writing a logic "0" so as to successively charge the nodal capacitances of transistors 12 and 14. The only way a logic "11" can be written into memory cell 10 is to deliberately write this information into the cell.

Another function performable by memory cell 10 is that of reading. In order to read out the cell, FLAG line 16 is raised in potential and the outputs from DATA and $\overline{\text{DATA}}$ lines 17 and 18 is monitored. If a logic "1" is to be read out, a pulse, illustrated as pulse 35 on FLAG line 16, will be conducted through DATA line 17 as the charge stored on transistor 12 enables DATA line 17 to be charged toward the potential of FLAG line 16. The resultant output waveform is illustrated by pulse 34. Since a logic "1" is stored in memory cell 10, transistor 14 has no charge stored thereon and therefore isolates $\overline{\text{DATA}}$ line 18 from FLAG line 16.

Figure 8:
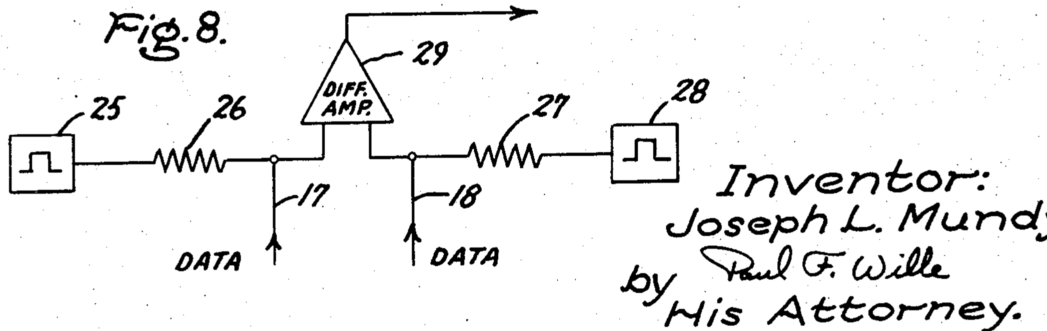
FIG. 8 illustrates some of the ancillary apparatus which can be used with a memory cell in accordance with the present invention.

If, however, a logic "0" were stored when FLAG line 16 is raised potential as illustrated by waveform 37, then the charge on transistor 14 would enable $\overline{\text{DATA}}$ line 18 to charge toward the potential of FLAG line 16. The resultant output waveform is illustrated in FIG. 3 by pulse 36. Since a "0" is stored by transistor 12, DATA line 17 is isolated from FLAG line 16 and no current flows therebetween. In reading out the DATA and $\overline{\text{DATA}}$ lines a sense amplifier would be connected to lines 17 and 18 to sense the difference in potential therebetween and thereby indicate whether a logic "1" or a logic "0" is stored in memory cell 10. An example of the ancillary apparatus that may be used with memory cell 10 is illustrated in FIG. 8 which will be more fully described hereafter.

The associative search function is illustrated in FIG. 4. In performing this function the logical inverse of the search information is applied to DATA an $\overline{\text{DATA}}$ lines 17 and 18. If the DATA stored in the memory cell is the inverse of the DATA line levels, then no current can flow to FLAG line 16. Thus, if all the DATA lines in the word are opposite to the stored DATA, FLAG line 16 will be low indicating a match with the search information. Specifically, in FIG. 4, when a logic "1" is being searched, a pulse is applied to $\overline{\text{DATA}}$ line 18 and DATA line 17 is maintained low. Since the pulse is applied to line 18 but the charge is stored in transistor 12, there is no way the current can flow from $\overline{\text{DATA}}$ line 18 through to FLAG line 16. Thus, when a "1" is stored there is no output on FLAG line 16. When, however, pulse 39 is applied to $\overline{\text{DATA}}$ line 18, if a "0" is stored, then transistor 14 has a charge thereon enabling it to conduct current from $\overline{\text{DATA}}$ line 18 to FLAG line 16. This pulse then appears on FLAG line 16 as an output pulse 40. Conversely, if one is searching for a "0" and a logic "1" is stored, then pulse 41 on DATA line 17 produces output pulse 42 on FLAG line 16. If, however, one is searching for a logic "0" and a logic "0" is stored, then pulse 43 on DATA line 17 produces no output on FLAG line 16.

The fourth function provided by memory cell 10 is an associative search with mask. The "mask" refers to the fact that a certain bit in a word will be ignored so that any mismatch between the search information and the stored information with respect to that particular bit will be ignored. In terms of memory cell 10, this means that an associative search is made with DATA and $\overline{\text{DATA}}$ line 17 and 18 in such a condition that the particular cell containing the bit to be masked is prevented from providing current to the FLAG line, independently of the cell contents. Due to the direct connection between transistors 12 and 14 in memory cell 10 and FLAG line 16, a complete mask operation is not possible. The most one can do for an associative search with mask in memory cell 10 is to have DATA and $\overline{\text{DATA}}$ lines 17 and 18 both low during the search operation. With this condition then, there is no pulse available that could be coupled to FLAG line 16 by either transistor 12 or transistor 14, regardless of the charged condition of transistor 12 or transistor 14.

Although the information of a particular memory cell is masked, the operation does not prevent the mismatch of another bit of the search information with the information stored in another memory cell from causing the appearance of a pulse on FLAG line 16. However, suppose another memory cell were attempting to raise FLAG line 16 indicating a mismatch and suppose further that a "1" is stored in memory cell 10. The operation then becomes similar to that for the read operation as described above in connection with FIG. 3; that is, the FLAG line is raised by another memory cell attempting to indicate mismatch and the FLAG line is at the same time tending to be discharged by the action of transistor 12 which has a "1" stored therein. Thus, if another memory cell produced a pulse such as pulse 40 or 42 indicating a mismatch between the contents of the cell and the search information, this pulse on the FLAG line could be considered to correspond to either pulse 35 or pulse 37, which would attempt to "read out" other memory cells connected to the same FLAG line and having their information masked by having both DATA and $\overline{\text{DATA}}$ lines 17 and 18 maintained at a relatively low potential. This phenomenon also occurs with the unmasked associative search and the result is that the FLAG potential will be greater than zero but not high enough to be detected as a high logic level indicating a mismatch. This ambiguity may be desirable, for example, if one is searching for all information in the vicinity (in Hamming space) of the search information as well as for an exact match.

As noted above, the information stored in memory cell 10 must be refreshed from time to time due to the dissipation of the stored charge across the p-n junction of MOS transistors 12 or 14. This refreshing operation is accomplished by reading out the cell contents and then writing the same information back into the cell. A register may be utilized to store the information read out from the memory cell 10 and then, in turn, be read out in order to write the information back into memory cell 10. Obviously, the contents of one memory cell may be read out and directly stored in another memory cell to achieve the refreshing of the information. Any technique may be used to refresh the information since all that is desired is that the charge, representing the information to be stored, be increased on the MOS device. Thus, any means for doing this may be suitably used with the memory cell of the present invention.

Figure 5:
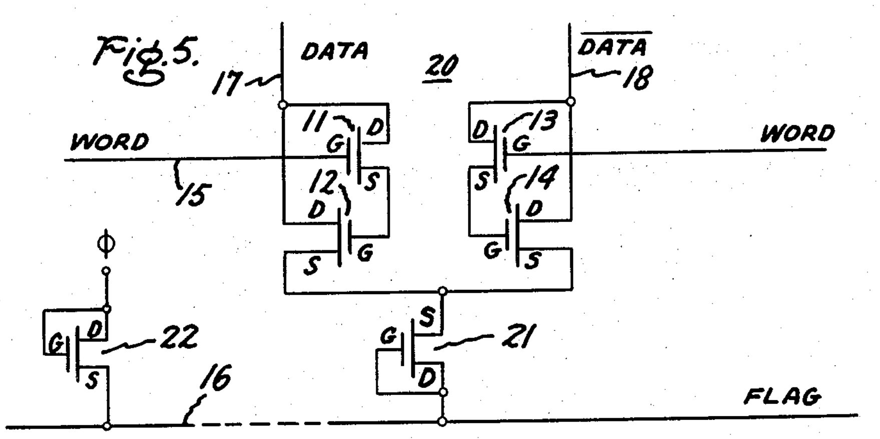
FIG. 5 illustrates an alternative embodiment of the present invention.

Another embodiment of the present invention is illustrated in FIG. 5 wherein there is shown a five transistor embodiment of the present invention. A five transistor memory cell is basically similar to the four transistor memory cell except that a transistor is utilized to isolate the common source electrodes of the cell from FLAG line 16. In so doing, the averaging effect achieved by the four-transistor cell is obviated.

Specifically, five-transistor cell 20 comprises MOS transistors 11-14 and transistor 21. Transistors 11-14 are connected, as described previously with reference to the four-transistor cell to WORD line 15, DATA line 17, and $\overline{\text{DATA}}$ line 18. The source electrodes of transistors 12 and 14 are connected together as they are in the four-transistor cell except that instead of being directly connected to FLAG line 16 they are coupled to FLAG line 16 by fifth transistor 21. Transistor 21 has its drain electrode connected to the source electrodes of transistors 12 and 14, and its gate and source electrodes connected to FLAG line 16. Transistor 21 functions as a diode to isolate cell 20 from FLAG line 16 during the search operation. While shown as also being an MOS transistor, transistor 21 may be MOS or bipolar type.

The functions achieved by the four-transistor cell, namely, writing, reading, associative search, and associative search with mask are also obtainable from five-transistor cell 20. Also, the five-transistor cell must be refreshed in the same manner as the four-transistor cell.

The writing and reading functions performed by the five-transistor cell 20 are identical to the writing and reading functions of the four-transistor cell.

Figure 6:
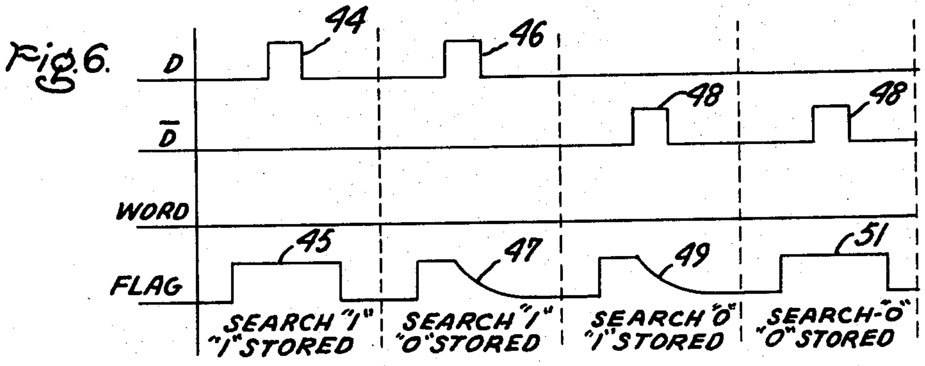
FIG. 6 illustrates waveforms useful in understanding the operation of the memory cell illustrated in FIG. 5.

When it is desired to perform an associative search with the five-transistor cell, the technique utilized is somewhat the opposite of that utilized with the four-transistor cell. Referring to FIG. 6 in which there are shown waveforms illustrating the operation of the five-transistor cell. When one is performing an associative search, FLAG line 16 is first brought to a high voltage level, for example, by ancillary apparatus illustrated in FIG. 5 as comprising transistor 22 coupled between a source of potential $\phi$ and FLAG line 16. In the associative search operation, the search information is applied directly to the DATA and $\overline{\text{DATA}}$ lines 17 and 18. If there is a mismatch, then the potential on the FLAG line is reduced. It will be recalled that for the four-transistor cell, the FLAG line is maintained at a low potential, the inverse of the search information is applied to DATA and $\overline{\text{DATA}}$ lines 17 and 18 and a mismatch raises the FLAG line. Thus, the associative search operation with a five-transistor cell is the inverse stored there is no output on FLAG line 16. When, however, pulse 39 is applied to DATA line 18, if a "0" is stored, then transistor 14 has a charge thereon enabling it to conduct current from DATA line 18 to FLAG line 16. This pulse then appears on FLAG line 16 as an output pulse 40. Conversely, if one is searching for a "0" and a logic "1" is stored, then pulse 41 on DATA line 17 produces output pulse 42 on FLAG line 16. If, however, one is searching for a logic "0" and a logic "0" is stored, then pulse 43 on DATA line 17 produces no output on FLAG line 16.

The fourth function provided by memory cell 10 is an associative search with mask. The "mask" refers to the fact that a certain bit in a word will be ignored so that any mismatch between the search information and the stored information with respect to that particular bit will be ignored. In terms of memory cell 10, this means that an associative search is made with DATA and DATA line 17 and 18 in such a condition that the particular cell containing the bit to be masked is prevented from providing current to the FLAG line, independently of the cell contents. Due to the direct connection between transistors 12 and 14 in memory cell 10 and FLAG line 16, a complete mask operation is not possible. The most one can do for an associative search with mask in memory cell 10 is to have DATA and DATA lines 17 and 18 both low during the search operation. With this condition then, there is no pulse available that could be coupled to FLAG line 16 by either transistor 12 or transistor 14, regardless of the charged condition of transistor 12 or transistor 14.

Although the information of a particular memory cell is masked, the operation does not prevent the mismatch of another bit of the search information with the information stored in another memory cell from causing the appearance of a pulse on FLAG line 16. However, suppose another memory cell were attempting to raise FLAG line 16 indicating a mismatch and suppose further that a "1" is stored in memory cell 10. The operation then becomes similar to that for the read operation as described above in connection with FIG. 3; that is, the FLAG line is raised by another memory cell attempting to indicate mismatch and the FLAG line is at the same time tending to be discharged by the action of transistor 12 which has a "1" stored therein. Thus, if another memory cell produced a pulse such as pulse 40 or 42 indicating a mismatch between the contents of the cell and the search information, this pulse on the FLAG line could be considered to correspond to either pulse 35 or pulse 37, which would attempt to "read out" other memory cells connected to the same FLAG line and having their information masked by having both DATA and DATA lines 17 and 18 maintained at a relatively low potential. This phenomenon also occurs with the unmasked associative search and the result is that the FLAG potential will be greater than zero but not high enough to be detected as a high logic level indicating a mismatch. This ambiguity may be desirable, for example, if one is searching for all information in the vicinity (in Hamming space) of the search information as well as for an exact match.

As noted above, the information stored in memory cell 10 must be refreshed from time to time due to the dissipation of the stored charge across the p-n junction of MOS transistors 12 or 14. This refreshing operation is accomplished by reading out the cell contents and then writing the same information back into the cell. A register may be utilized to store the information read out from the memory cell 10 and then, in turn, be read out in order to write the information back into memory cell 10. Obviously, the contents of one memory cell may be read out and directly stored in another memory cell to achieve the refreshing of the information. Any technique may be used to refresh the information since all that is desired is that the charge, representing the information to be stored, be increased on the MOS device. Thus, any means for doing this may be suitably used with the memory cell of the present invention.

Another embodiment of the present invention is illustrated in FIG. 5 wherein there is shown a five transistor embodiment of the present invention. A five transistor memory cell is basically similar to the four transistor memory cell except that a transistor is utilized to isolate the common source electrodes of the cell from FLAG line 16. In so doing, the averaging effect achieved by the four-transistor cell is obviated.

Specifically, five-transistor cell 20 comprises MOS transistors 11-14 and transistor 21. Transistors 11-14 are connected, as described previously with reference to the four-transistor cell to WORD line 15, DATA line 17, and DATA line 18. The source electrodes of transistors 12 and 14 are connected together as they are in the four-transistor cell except that instead of being directly connected to FLAG line 16 they are coupled to FLAG line 16 by fifth transistor 21. Transistor 21 has its drain electrode connected to the source electrodes of transistors 12 and 14, and its gate and source electrodes connected to FLAG line 16. Transistor 21 functions as a diode to isolate cell 20 from FLAG line 16 during the search operation. While shown as also being an MOS transistor, transistor 21 may be MOS or bipolar type.

The functions achieved by the four-transistor cell, namely, writing, reading, associative search, and associative search with mask are also obtainable from five-transistor cell 20. Also, the five-transistor cell must be refreshed in the same manner as the four-transistor cell.

The writing and reading functions performed by the five-transistor cell 20 are identical to the writing and reading functions of the four-transistor cell.

When it is desired to perform an associative search with the five-transistor cell, the technique utilized is somewhat the opposite of that utilized with the four-transistor cell. Referring to FIG. 6 in which there are shown waveforms illustrating the operation of the five-transistor cell. When one is performing an associative search, FLAG line 16 is first brought to a high voltage level, for example, by ancillary apparatus illustrated in FIG. 5 as comprising transistor 22 coupled between a source of potential $\phi$ and FLAG line 16. In the associative search operation, the search information is applied directly to the DATA and DATA lines 17 and 18. If there is a mismatch, then the potential on the FLAG line is reduced. It will be recalled that for the four-transistor cell, the FLAG line is maintained at a low potential, the inverse of the search information is applied to DATA and DATA lines 17 and 18 and a mismatch raises the FLAG line. Thus, the associative search operation with a five-transistor cell is the inverse of the associative search operation with a four-transistor cell.

Waveform 45 in FIG. 6 represents the initial raising of FLAG line 16 to a high potential. If, for example, a "1" is being searched and a "1" is stored, then there is no effect on pulse 45 by the existence of pulse 44. This is due to the fact that, when a "1" is stored, transistor 12 is capable of conduction. A pulse on DATA line 17 would only be the same potential as FLAG line 16. Thus, pulse 44 has no effect on the potential of FLAG line 16. When, however, a pulse 46 is applied to DATA line 17, that is, a "1" is being searched and a "0" is stored, then the potential on FLAG line 16 appears as is shown by waveform 47. The coupling of $\overline{\text{DATA}}$ line 18 to a source of ground potential and the charge on transistor 14 combine to provide a discharge path for FLAG line 16 through transistors 21 and 14 to $\overline{\text{DATA}}$ line 18. Thus, FLAG line 16 is discharged, thereby indicating a mismatch between the search information and the stored information. In a similar manner when a "0" is searched and a "1" is stored, the coupling of ground potential or a low potential to DATA line 17 will discharge FLAG line 16 through transistors 21 and 12. However, when a "0" is searched and a "0" is stored the potential of $\overline{\text{DATA}}$ line 18 is approximately equal to FLAG line 16 and therefore no discharge takes place.

In performing the associative search with mask function, one merely keeps both DATA line 17 and $\overline{\text{DATA}}$ line 18 at a high potential. The cell then will not contribute to the discharge of FLAG line 16 regardless of the contents of the cell. Again, this is due to the fact that the potential on DATA line 17 and $\overline{\text{DATA}}$ line 18 is approximately equal to the potential on FLAG line 16 thereby removing any path of discharge for FLAG line 16.

The refreshing operation for the information contained in memory cell 20 is performed in the same manner as that described in connection with four-transistor memory cell 10.

There is one additional property which is occasionally useful in a content addressed memory. It is possessed by both four-transistor cell 10 and five-transistor cell 20. This is the "don't care" mode of cell content. This means that a memory cell does not contribute to the mismatch regardless of the condition of the DATA lines. For both memory cell 10 and memory cell 20, this is accomplished by storing a "0" on transistors 12 and 14. This prevents any current flow through transistors 12 and 14 and removes these transistors from contributing to the matching operation.

Figure 7:
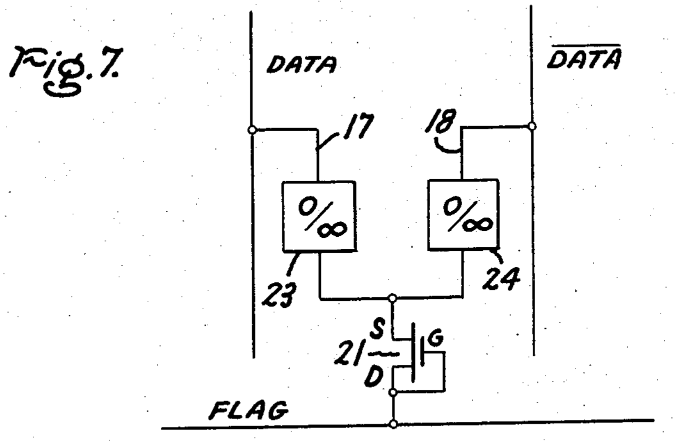
FIG. 7 illustrates a read only-search only memory in accordance with the present invention.

In FIG. 7 there is illustrated another embodiment of the present invention wherein the memory cell has been modified to provide a read only-search only content addressed memory. In this form of memory, the WORD line is eliminated since this line is utilized only for the writing operation and the DATA and $\overline{\text{DATA}}$ lines 17 and 18 are connected to isolating transistors 21 by impedances 23 and 24, respectively. These impedances may be either a very high or very low impedance depending upon the information to be permanently stored. Impedances 23 and 24 takes the place of transistors 12 and 14. Transistors 11 and 13 are eliminated along with WORD line 15. Transistor 21, then, becomes the sole transistor in this type of memory. In this form, the read and search operations may be performed with the memory in the same manner as described above, but the writing operation is eliminated. Also, in this form, the information within the memory does not have to be refreshed since it is permanent. The high and low impedances may, for example, comprise open and short circuits, respectively.

In FIG. 8 there is illustrated a portion of the ancillary equipment that can be used with the memory cell of the present invention. As shown in FIG. 8, DATA and $\overline{\text{DATA}}$ lines 17 and 18 are respectively connected to the difference inputs of differential amplifier 29. Coupled to the DATA and $\overline{\text{DATA}}$ lines are driver circuits 25 and 28, respectively. Driver circuits 25 and 28 are isolated from the DATA and $\overline{\text{DATA}}$ lines by impedances 26 and 27. The driver circuits provide the pulses utilized during the write and search operations of the memory. Differential amplifier 29 is utilized to compare the outputs from DATA and $\overline{\text{DATA}}$ lines 17 and 18 during the read operation as described above.

Thus, it can be seen that there has been provided a memory cell having the minimum number of transistor devices and signal lines and yet providing a full complement of functions. This is in part achieved by utilizing different sets of the signal lines as inputs or outputs depending upon a particular operation. Further, by utilizing so few MOS transistor devices and lines, the individual memory cells occupy a relatively small area on a substrate. A conservatively designed cell occupies an area on the substrate of about 15 mils$^2$. Stated another way, about $6.6 \times 10^4$ cells/in$^2$ of substrate may be obtained. Further, if so desired, both the erasable memory cell illustrated in FIGS. 1 and 5 and the non-erasable memory cell illustrated in FIG. 7 may be fabricated upon the same substrate. The non-erasable memory cell illustrated in FIG. 7 would obviously comprise a smaller area even than the memory cells illustrated in FIGS. 1 and 5.

Having thus described the invention, it will be apparent to those of ordinary skill in the art that many modifications may be made within the spirit and scope of the present invention.

What I claim as new and desire to secure by Letters Patent of the United States is:

1. A memory cell comprising:

two pairs of MOS transistors, each pair capable of acting independently of the other;

four signal lines;

a first of said pairs comprising first and second MOS transistors having the drains thereof connected together, the source of the first transistor connected to the gate of the second transistor, and the drains of said transistors, the gate of the first transistor and the source of the second transistor connected to three of said four signal lines;

the other of said pairs comprising third and fourth MOS transistors having the drains thereof connected together, the source of the third transistor connected to the gate of the fourth transistor and the drains of said third and fourth transistors, the gate of said third transistor and the source of said fourth transistor connected to a different three of said four signal lines.

2. A memory cell as set forth in claim 1 wherein said four signal lines comprise DATA, $\overline{\text{DATA}}$, WORD, and FLAG lines and wherein the first transistor pair interconnects said DATA, WORD, and FLAG lines and the second transistor pair interconnects said $\overline{\text{DATA}}$, WORD, and FLAG lines.

3. A memory cell as set forth in claim 2 wherein:
 the source electrode of said one transistor is coupled to said FLAG line;
 the gate electrode of said other transistor is coupled to said WORD line; and
 the drain electrodes of both transistors are coupled in a first pair, to the DATA line and, in the second pair, to the $\overline{\text{DATA}}$ line.

4. A memory cell as set forth in claim 3 further comprising:
 a fifth transistor coupling to said FLAG line the source electrodes of said one transistors in each pair.

5. A memory cell as set forth in claim 2 further comprising:
 a fifth transistor coupling said transistor pairs to said FLAG line.

6. A computer memory containing a plurality of memory cells arranged in a matrix array wherein each memory cell comprises:
 four signal lines;
 two pairs of MOS transistors, each pair interconnecting different sets of three of said signal lines; and wherein
 each pair comprises first and second MOS transistors having the gate of said second transistor connected to the source of said first transistor and the drain of said first and second transistors connected together, the gate of said second transistor and the source of said first transistor forming a storage node, said first transistor acting as a gate for blocking or passing signals from said signal lines to said storage node and said second transistor blocking or passing signals to said signal lines from said storage node in accordance with the information stored on the storage node of each set.

7. A computer memory as set forth in claim 6 further comprising:
 a fifth MOS transistor for coupling both transistor sets to a signal line common to both sets of three signal lines.

8. A read only-search only memory containing a plurality of memory cells arranged in a matrix array containing a FLAG line and parallel DATA and $\overline{\text{DATA}}$ lines intersecting said FLAG line, each memory cell comprising a pair of fixed impedance means, each in either a low or a high impedance condition, depending upon the information to be permanently stored, and coupling said FLAG line to said DATA and $\overline{\text{DATA}}$ lines, respectively.

9. A read only-search only memory as set forth in claim 8 wherein said low or high impedances comprise short or open circuits, respectively.

10. A read only-search only memory as set forth in claim 8 further comprising transistor means for coupling both of said fixed impedance means to said FLAG line, whereby the contents of the memory cell is isolated from the FLAG line.

11. A computer memory containing a plurality of memory cells arranged in a matrix array, said plurality of memory cells divisible into two groups and comprising: erasable and non-erasable memory cells;
 each erasable memory cell comprising four signal lines and four MOS transistors; said transistors being grouped into two pairs, each pair interconnecting a different set of three of said four signal lines;
 each non-erasable memory cell comprising a pair of fixed impedances, each in either a low or high impedance condition and coupling said signal lines into two different sets of two lines each.

12. A computer memory as set forth in claim 11 wherein said plurality of memory cells are fabricated on a single substrate.

13. A computer memory as set forth in claim 11 wherein
 said four signal lines comprise DATA, $\overline{\text{DATA}}$, WORD, and FLAG lines;
 said MOS transistor pairs comprise a first MOS transistor acting as a gate for blocking or passing signals from said signal lines and a second MOS transistor for blocking or passing signals to said signal lines in accordance with the charge stored on the nodal capacitance of said pair.

14. A computer memory as set forth in claim 13 wherein said MOS transistor pairs interconnect said DATA, WORD, and FLAG lines and said $\overline{\text{DATA}}$, WORD, and FLAG lines, respectively.

15. A computer memory as set forth in claim 14 and further comprising:
 a fifth transistor coupling both of said MOS transistor pairs to said FLAG line.

16. A computer memory as set forth in claim 13 wherein said non-erasable memory cell comprises:
 DATA, $\overline{\text{DATA}}$, and FLAG signal lines;
 a pair of fixed impedance means, each in either a high or a low impedance state, depending upon the information to be permanently stored, coupling said FLAG line to said DATA and $\overline{\text{DATA}}$ lines, respectively.

17. A computer memory as set forth in claim 16 and further comprising:
 a transistor for coupling both of said fixed impedance means to said FLAG line.

18. A computer memory as set forth in claim 16 wherein said MOS transistor pairs interconnect said DATA, WORD, and FLAG lines and said $\overline{\text{DATA}}$, WORD, and FLAG lines, respectively.

19. A computer memory as set forth in claim 18 and further comprising:
 a fifth transistor in said erasable memory cell for coupling both of said MOS transistor pairs to said FLAG line.

20. A computer memory as set forth in claim 19 and further comprising:
 a transistor in said non-erasable memory cell for coupling both of said fixed impedance means to said FLAG line.

21. A computer memory as set forth in claim 20 wherein said fifth transistor in said erasable memory cell and said transistor in said non-erasable memory cell are of the field effect type.

22. A computer memory as set forth in claim 20 wherein said fifth transistor in said erasable memory cell and said transistor in said non-erasable memory cell are of the bi-polar type.

* * * * *